United States Patent Office 3,277,209
Patented Oct. 4, 1966

3,277,209
VULCANIZATION PROCESS
Arnold A. Giller, Wehen, Taunus, Germany, assignor to Chemische Werke Albert, Wiesbaden-Biebrich, Germany, a corporation of Germany
No Drawing. Filed Oct. 11, 1963, Ser. No. 315,701
Claims priority, application Germany, Oct. 13, 1962, C 28,170; July 27, 1963, C 30,566; Aug. 8, 1963, C 30,649
14 Claims. (Cl. 260—845)

This application is a continuation in part of my copending applications Serial No. 37,111, filed June 20, 1960 now Patent 3,189,567, Serial No. 140,637, filed September 19, 1961 now abandoned, Serial Nos. 154,825 now Patent 3,220,964 and 154,826, both filed November 24, 1961, Serial No. 277,432, filed May 2, 1963, and Serial No. 194,995, filed May 15, 1962 now abandoned.

This invention is concerned with improvements in or relating to the vulcanisation of natural or synthetic elastomers. In particular it is concerned with a process for the vulcanisation of elastomers based on polymers or copolymers of butadiene or isoprene using phenol resins.

According to the publications of Wildschut and Van der Meer that elastomers of natural or synthetic origin may be vulcanized by phenol resins of the resol type. Suitable vulcanisates have however only been obtained using high proportions of resin, for example 30 percent by weight based on the weight of the elastomer and using long vulcanisation times.

The vulcanisation of elastomers or elastomer mixtures by phenol resins, hereinafter referred to as "resin vulcanisation," proceeds faster and more intensively if metal halides, for example $SnCl_2 \cdot 2H_2O$ are added to the mixtures. A disadvantage of this procedure is, however, the corrosive action exerted by metal halides on metals, and the fact that often they may only be incorporated into the elastomer mixtures with difficulty. The metal halides may alternatively be produced in situ in the mixtures from a metal oxide such as zinc oxide and a halogen donor.

However though the mixtures may then be processed without difficulty, the acceleration of the vulcanisation is significantly smaller than when the metal halides are added as such, and is moreover sometimes insufficient. The effect of the metal halides is however dependent on the type of elastomer used. In the case of butyl rubber for example, the cross-linking reaction is distinctly activated. However when other elastomers, for example nitrile rubber, are used the tendency to form cyclisation products from the elastomers is favored.

According to the present invention there is provided a process for the vulcanisation of one or more natural or synthetic elastomeric diene polymers or copolymers in which the diene component is butadiene or isoprene, and which contain at most only a minor proportion, i.e. generally less than 20%, preferably less than 10%, by weight of polymerised isomonoolefine comprising using a phenol aldehyde resin containing free or etherified or esterified alkylol and free or esterified phenol groups, as a vulcanising agent, and an acid as an activator, said acid being a monobasic organic acid having up to 12 carbon atoms, an organic polybasic acid, an anhydride of said acids where such exists, a complex acid of a zinc halide or of boron trifluoride with any one of the aforementioned acids or with a monohydric or polyhydric alcohol, or a complex compound of boron trifluoride with water. Mixtures of such activators may also be used. These compounds are hereinafter referred to as activators.

Particularly suitable activators are unsaturated di-carboxylic acids or their anhydrides where such exist such as fumaric acid, maleic anhydride, itaconic acid, mesaconic acid, citraconic anhydride, dodecenyl succinic anhydride, tetrahydrophthalic anhydride, methyl-tetrahydrophthalic anhydride, $\Delta^4$-endomethylene tetrahydrophthalic anhydride and its methyl derivative; saturated dicarboxylic acids or their anhydrides such as oxalic, malonic, succinic, adipic, azelaic or sebacic acid; aromatic polycarboxylic acids or their anhydrides where such exist such as phthalic acid, iso- or terephthalic acid, phthalic anhydride, trimellitic acid, trimellitic anhydride, pyromellitic dianhydride; naphtalene carboxylic acids or their anhydrides; monobasic organic acids, or their anhydrides where such exist. Examples of such acids and anhydrides are sulphonic acids, such as toluene sulphonic acids, naphthalene sulphonic acids, camphor sulphonic acids; carboxylic acids with 2 to 12, preferably 3 to 11 carbon atoms, such as acetic, propionic, benzoic or phenyl acetic acid; fatty acids with a strongly cross-linked chain and 9 to 11 carbon atoms; chlorinated or brominated acids such as mono-, di- or trichloroacetic acid or anhydrides such as acetic anhydride or lactones—which are to be considered as intramolecular anhydrides such as butyrolactone. The acids may conveniently be incorporated in an amount of from 0.2 to 5, preferably from 1 to 4 percent by weight of the elastomer. Higher dosages may be used provided the solubility is fairly satisfactory.

The effect of the organic acids is dependent on the type of the elastomer to be cross-linked, on the type of the resin used and on the presence or absence of fillers and other auxiliary agents. An especially good effect is attained if the acids or their anhydrides are substantially completely compatible with the elastomer so that the vulcanisate appears homogenous when a thin section thereof is viewed through a microscope. This requirement is often better fulfilled by anhydrides than by the corresponding acids. Pyromellitic dianhydride is for example an excellent accelerator for the resin vulcanisation, while pyromellitic acid in some cases has a tendency to conglomerate into small heterogeneous masses in the vulcanisate and is therefore less effective as an activator. The compatibility of the acid activator with the elastomers may be improved by preparing a paste or dissolving the acid in suitable plasticizers such as esters, mineral oils, aliphatic or aromatic polyethers and liquid resins, for example liquid alkyd resins. It is further possible to improve the compatibility of the acid by introducing suitable substituents, for example halogen atoms or nitro groups.

The complex acid activators of (A) zinc halides or boron trifluoride and (B) mono- and/or polybasic organic acids, mono- and/or polyhydric alcohols as well as the boron trifluoride water compounds, may be used together with the simple acid activators of the present invention. The acids used to form the zinc halide and boron trifluoride complex acids are conveniently saturated monocarboxylic acids having 2 to 12 carbon atoms or monohydric or polyhydric alcohols. Saturated or olefinically unsaturated alcohols may be used; preferably however saturated aliphatic alcohols having up to 12 carbon atoms are used. The complex acids of zinc halides have been described by Meerwein in Liebigs "Annalen der Chemie," volume 455 (1927), pages 244 et seq., and also by F. Hein in "Chemische Koordinationslehre," Leipzig, 1950, pages 309 et seq. and 504–510. The complex acids of boron-trifluoride have been described for example by H. Meerwein and W. Pannwitz in "Journal für praktische Chemie" volume 141 (1934), pages 123 to 148 as well as in "Borfluorid und seine Verbindungen als Katalysatoren in der organischen Chemie" of Topciev, Zavgorodnij and Panskin, Berlin (1962), particularly at pages 38–83.

The effect of the complex acid zinc and boron trifluoride activators is dependent on their composition, that is on the specific halide and organic acid or alcohol used. In principle the joint use of acids and alcohols is also possible; however in this case side reactions, such as an ester formation, may occur.

The zinc halide used may conveniently be zinc chloride and/or zinc bromide. Zinc iodide is also suitable but is not usually used since it is more expensive. Of the boron trifluoride compounds there are especially suitable the complex compounds with organic acids, for example acetic acid, and with alcohols such as butanol which complex compounds may be distilled without decomposition and which are readily crystallizable.

The acid component of the zinc halide or boron fluoride complex may conveniently be acetic acid. Alcohols which may be used include methanol, ethanol, the propanols and butanols (and homologues thereof, for example lauryl alcohol), benzyl alcohol, ethane-, propane-, butane-, butene- or hexane-diols and chlorinated alcohols.

In general the use of these complex activators gives a fast and intense vulcanisation of the elastomer mixtures. The resulting vulcanisates have good physical properties and moreover the activators may be easily worked into the elastomer mixtures. By a suitable selection of the metal halide and the acid or the alcohol the vulcanising effect may be adjusted to the ratio of the ingredients of the composition and also to fulfill certain requirements for special end uses of the elastomer. Thus, for example, the complex compound of zinc chloride and acetic acid is a strong activator in the vulcanisation of mixtures of butadiene-styrene rubber and carbon black. For similar mixtures which are to be cross-linked more slowly and to a smaller extent, activators of zinc chloride and butanol or lauryl alcohol are more preferred.

The boron trifluoride and zinc halide activators of the present invention may be produced in any convenient way; for example the zinc halide complexes may be prepared by dissolving the zinc halide in the organic acid or the alcohol to give liquid or crystalline compounds. They may conveniently be used in an amount of 0.2 to 5 percent by the weight of the elastomer. The preferred amount of the zinc halide activators is 1 to 3, that of the boron-fluoride activators is 0.5 to 2 percent by weight. Larger amounts may be used but as a rule no advantage is attained thereby. In some cases the activating effect may even be reduced again. It is also possible to use mixtures of more than one activator, for example of zinc halide and boron trifluoride activators.

The accelerating effect of the activators of the present invention, especially the organic acid activators on the resin vulcanisation may generally be further improved by the use of zinc oxide or reactive metal oxides other than the alkali metal oxides, i.e. oxides of the metals of groups II and/or III of the periodic table and/or oxides of the heavy metals, for example lead or magnesium oxide, as subsidiary accelerators. By the term "heavy metal" in this specification I mean a metal having a specific gravity of at least 4.

Of course it is also possible to use metal salts of weak acids, for example, of the above-mentioned acids, and the same metals provided these are compatible with the mixture to be vulcanized to a satisfactory extent. Preferred salts are zinc, iron, tin and/or aluminum salts.

Salts of monocarboxylic acids of more than 12 carbon atoms may also be used together with the acid activators to provide for the desired metal component. The metal oxides or salts respectively are added for example in an amount of up to about 15, preferably 3 to 10 percent by weight of the elastomer. The addition of higher amounts, for example of 25 percent by weight is also possible.

The accelerating effect of the activators is however only slightly affected by the above-mentioned oxides or salts. Their use, however, is nevertheless of advantage, since the ageing stability of the vulcanisates is improved and the acid effect of the activators is neutralized. The amount of the metal oxides or metal salts is in this case preferably from 0.5 to 10 percent of the weight of the elastomer. Under certain conditions, for example if the mixtures are prepared in the hot, smaller amounts of metal oxide or salt respectively may be sufficient. On the other hand it is in principle also possible to add more than 10 percent by weight thereto.

Moreover it is possible to accelerate the resin vulcanisation by the addition of halides of metals of groups II and/or III of the periodic table and/or of one or more heavy metals, i.e. of metals having a specific weight above 4. These metal halides may be produced in the mixture before or during the vulcanisation. They are conveniently used in an amount of 0.1 to 8, preferably 0.5 to 2 percent of the elastomer. Suitable metal halides or suitable metal compounds and halogen donors are described in patent application No. 194,995, filed May 15, 1962, now abandoned.

The present invention is applicable for example to mixtures of butadiene-acrylonitrile rubber, butadiene-styrene rubber, polybutadiene, polyisoprene, natural rubber and polychloroprene or mixtures of several elastomer types. The use of organic acids is not suitable for butyl rubber, since the vulcanisates are not as resistant towards ageing as those, which are obtained by the resin vulcanisation activated by metal halides.

Suitable cross-linking (or vulcanisation) agents include the di- or polyalkylol compounds (preferably the di- or polymethylol compounds) of phenol, substituted phenols and the bisphenols as well as the high molecular weight resins obtainable by further condensation of these alkylol derivatives. The substituted phenols may be substituted ortho or para or in one or both metapositions or in an ortho or para position as well as in one or both meta positions. For the sake of brevity these products are hereinafter referred to as "phenol resins." They are generally produced by an alkaline condensation of a phenol with one or more aldehydes having 1 to 7 carbon atoms and contain 2 to 4 terminal alkylol groups per molecule. The aldehyde may for example be acetaldehyde, propionaldehyde, butyraldehyde, isobutyraldehyde, crotonoaldehyde, benzaldehyde or furfural, but preferably formaldehyde is used. The organic acids are, as was shown above, also excellent activators for the vulcanisation of elastomer mixtures by phenol resins, which contain more than two reactive groups in the molecule and which may be used on their own to give three-dimensional cross-linked resites. In elastomer mixtures these resins become vulcanisation agents for the elastomer particularly under the action of organic acids and substantially no autocondendensation of the resin occurs.

Suitable resins are obtained for example by condensation of the following mono-molecular di- or polymethylol compounds:

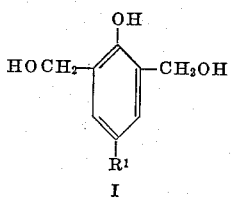

I

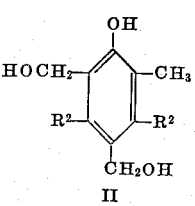

II

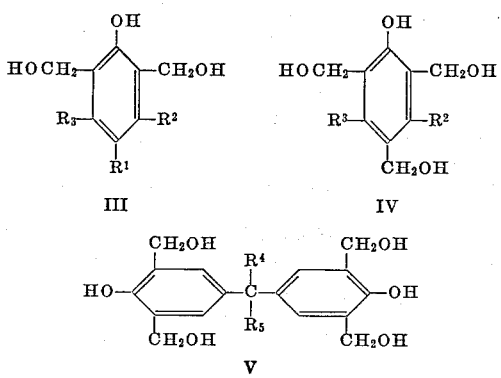

III    IV

V $R^1$, $R^2$, $R^3$, $R^4$ and $R^5$ may be the same or different. They represent H or a hydrocarbon radical having for example 1 to 12 carbon atoms or another group which does not react with the elastomer, for example $NO_2$ or halogen. $R^1$ to $R^5$ together should preferably not contain more than 14 carbon atoms. $R^1$ preferably contains 4 to 8, and $R^2$ and $R^3$ together preferably up to 5 carbon atoms. Suitable substituents are for example the methyl, ethyl, propyl, isopropyl, tert.-butyl, amyl, disobutyl, nonyl, cyclohexyl, phenyl, tolyl and xylyl radicals. Phenol resins which contain halomethyl groups in addition to alkylol groups may also be used. The alkylol groups of the phenol resins may be partially or completely etherified by aliphatic or aromatic alcohols, for example by the monohydric alcohols corresponding to the said alkyl radicals, benzylalcohol etc. The alkylol groups and/or the phenolic hydroxy groups may also be esterified by organic acids.

While the presence of alkylol groups in the phenol resins is favorable for cross-linking it is not obligatory. Thus resins may be used as vulcanizing agents which are formed from dimethyl-phenol compounds by cyclic condensation and which have the general Formula VI.

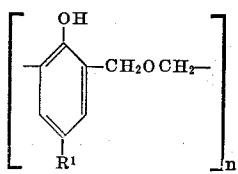

VI

In this formula $n$ is the number of the ring members; it is an integer of at least 2 and preferably is from 3 to 8. The $-CH_2-O-CH_2-$ groups may also partially be replaced by $-CH_2-$ links, but the reactivity of the condensation products is reduced as the number of $-CH_2$ links increases. In this case the methylene ether groups $-CH_2-O-CH_2-$ which are present in almost all phenol resins and which connect two phenol nuclei each, are reactive in the same manner as two methylol groups.

The phenol resins may be used in the form of solid resins, powdered resins or as dissolved resins. In order to carry out the vulcanisation there are used generally from 0.5 to 8, preferably from 2 to 6 percent by weight of resins by the weight of the elastomer. The cross-linking effect is improved with an increasing amount of the resin.

Finally it is possible also to use the accelerators known from sulfur vulcanisation such as the piperidine salt of pentamethylenedithiocarbamic acid, aniline hydrochloride, zinc ethylphenyldithiocarbamate, 2-mercaptobenzothiazol, dibenzothiazyldisulphide, N-cyclohexyl-2-benzothiazylsulphenamide or diphenylguanidine. However, as a rule, visible advantages are not obtained thereby.

The elastomer mixtures may be produced, processed and vulcanized in a conventional manner. The mixing order may be changed as desired. It is only necessary that the ingredients of the mixture be well distributed. The properties of the vulcanisation products may be improved by rolling or tempering the mixture at elevated temperatures, for example at a temperature of 100 to 200° C. In all cases the use of fillers is suitable and this will obviously influence the vulcanisation process. Vulcanisates obtained using active carbon black have a higher tensile strength than those obtained using silicic acids or kaolin. Furthermore aging preservatives such as derivatives of p-phenylenediamine, plasticizers, for example the above-mentioned and the auxiliary agents of various kinds, for example fatty acid soaps, paraffins, waxes may also be used. When adding auxiliary agents of a basic nature a trial run should be carried out to examine to what extent they interfere with the effect of the activators.

The vulcanisation products prepared according to the invention are suitable for the manufacture of brake linings, inner tubes, packing sheets, sole materials, tires, automobile accessories and other commercial rubber goods.

The invention is illustrated by the following examples. Parts and percentage figures are by weight. The physical properties of the vulcanisation products are always indicated in the order used in Example 1.

$M$=Mixture
$t$=Vulcanisation time (minutes)
$T$=Tensile strength (kg./cm.$^2$)
$E$=Elongation at break (percent)
$M150$=Modulus at 150% elongation (kg./cm.$^2$)
$M300$=Modulus at 300% elongation (kg./cm.$^2$)
$PE$=Permanent elongation (percent)
$TR$=Tear resistance (kg./cm.)
$H$=Hardness (° Shore A)
$R$=Rebound elasticity (percent)
$Pl$=Plasticity
$A70, 14$=Aging during 14 days at 70° C.

The properties of the vulcanisates were examined using standardized rings of an inner diameter of 44.6 mm., an outer diameter of 52.6 mm. and a wall thickness of 6 mm. according to the DIN standard. The tear resistance was examined using a small ring containing three notches having an outer diameter of 44.6 mm., an inner diameter of 36.6 mm. and a wall thickness of 6 mm., i.e. not according to the DIN-standard. The permanent elongation was the increase of the gauge length of the ring used immediately after breaking. The plasticity was measured with a Hoekstra Plastometer. The figures given for plasticity are hundredths of a millimeter and are the thickness of a sheet originally 1 mm. thick, of the unvulcanized mixture when compressed at 100° C. under a pressure of 10 kg./cm.$^2$ for 15 and 30 seconds respectively.

*Example 1*

Mixtures I to VI were produced at about 90 to 110° C. from acrylonitrile-butadiene-rubber. More specifically mixture I, which is given for comparison purposes only and is not an example of this invention, was produced according to the process in U.S. application 140,637, filed September 19, 1961 now abandoned. The other mixtures describe the use of difunctional resins in accordance with the invention. The elastomers were milled between rollers until uniform products were produced from mixture I. Thereafter stearic acid, zinc oxide and where stated other organic acids were added thereto. Then carbon black was worked in and finally the resin was incorporated. The vulcanisation temperature was 155° C.

| Mixture | I | II | III | IV | V | VI |
|---|---|---|---|---|---|---|
| Acrylonitrile-butadiene rubber (commercial type containing about 38 to 40% by weight of acrylonitrile portion) | 96 | 100 | 100 | 100 | 100 | 100 |
| Chlorosulphonated polyethylene (about 29% of chlorine, 1.25% of sulphur) | 2 | | | | | |
| Bromobutyl rubber (2-3% of bromine) | 2 | | | | | |
| Stearic acid | 0.8 | 1 | 1 | 1 | 1 | 1 |
| Zinc oxide | 5 | 5 | | 5 | 5 | 5 |
| High abrasion furnace carbon black | 50 | 50 | 50 | | 50 | 50 |
| Active precipitated silicic acid | | | | 40 | | |
| Fumaric acid | | 2 | 2 | | 2 | 2 |
| Pyromellitic dianhydride | | | | 3 | | |
| p-Octylphenol resin (with about 2 mols of added formaldehyde) | 6 | 6 | | | | |
| p-Octylphenol resin (with about 1.8 mols of added formaldehyde) | | | 6 | 6 | 6 | 6 |
| Dibutylphthalate | | | | | 20 | |
| Alkyd resin containing 76% of fatty acid and 17% of phthalic anhydride | | | | | | 20 |

PHYSICAL PROPERTIES OF MIXTURES I TO VI

| M | t | T | E | M150 | M300 | PE | TR | H | R | P1 |
|---|---|---|---|---|---|---|---|---|---|---|
| I | 20 | 188 | 519 | 36 | 101 | 29 | 24 | 70 | 19 | 85/78 |
|   | 40 | 232 | 346 | 79 | 203 | 8 | 18 | 75 | 19 |  |
|   | 60 | 234 | 299 | 95 | 234 | 7 | 16 | 76 | 19 |  |
| II | 20 | 250 | 434 | 56 | 168 | 14 | 20 | 72 | 20 | 83/75 |
|   | 40 | 262 | 318 | 96 | 252 | 6 | 15 | 76 | 20 |  |
|   | 60 | 240 | 252 | 119 |  | 4 | 13 | 78 | 19 |  |
| III | 20 | 237 | 368 | 58 | 188 | 10 | 17 | 71 | 20 | 82/73 |
|   | 40 | 267 | 292 | 102 |  | 5 | 13 | 75 | 20 |  |
|   | 60 | 227 | 229 | 125 |  | 3 | 11 | 77 | 19 |  |
| IV | 20 | 195 | 566 | 39 | 82 | 28 | 16 | 75 | 19 | 94/92 |
|   | 40 | 190 | 450 | 53 | 113 | 20 | 15 | 80 | 19 |  |
|   | 60 | 190 | 400 | 64 | 135 | 20 | 15 | 82 | 19 |  |
| V | 20 | 192 | 573 | 21 | 74 | 20 | 31 | 57 | 31 | 43/34 |
|   | 40 | 209 | 426 | 42 | 133 | 11 | 19 | 64 | 30 |  |
|   | 60 | 200 | 347 | 54 | 170 | 6 | 17 | 66 | 32 |  |
| VI | 20 | 157 | 518 | 23 | 74 | 19 | 22 | 62 | 23 | 60/50 |
|   | 40 | 176 | 392 | 42 | 130 | 10 | 18 | 66 | 23 |  |
|   | 60 | 176 | 336 | 55 | 157 | 7 | 14 | 69 | 23 |  |

A comparison of mixtures II and III with the reference mixture I shows that fumaric acid accelerates the resin vulcanisation more intensively than the metal halides formed in situ of mixture I, since in mixtures II and III the modulus values at 150 and 300% elongation and the tensile strength are considerably higher than in mixture I. As is shown by the results obtained with the use of mixture III, the use of zinc oxide is not necessary although the resin used was less reactive than the resin used in mixtures I and II. Vulcanisates, which have similar properties to those of mixture II are obtained if 2.0 parts of maleic anhydride are used for the acceleration of the vulcanisation. Finally mixtures IV to VI show that the resin vulcanisation activated by organic acids may also be used on mixtures with light colored fibers and also on mixtures containing a plasticizer.

*Example 2*

Good vulcanising effects were also obtained when using only 3 percent by weight of phenol resins, calculated on the rubber.

| Mixture | VII | VIII | IX | X | XI | XII |
|---|---|---|---|---|---|---|
| Acrylonitrile-butadiene rubber (see Example 1) | 100 | 100 | 100 | 100 | 100 | 100 |
| Stearic acid | 1 | 1 | 1 | 1 | 1 | 1 |
| Zinc oxide | 5 | 5 | 5 | 5 | 5 | 5 |
| Pyromellitic dianhydride | 3 | 3 | | | | |
| Fumaric acid | | | 2 | 2 | 2 | 2 |
| High abrasion furnace carbon black | 45 | 45 | 45 | 45 | 45 | 45 |
| p-Octylphenol resin (see Example 1, mixtures I and II) | 4 | 3 | 4 | 3 | | |
| p-Tert. butyl phenol resin (with more than 1.5 mols added formaldehyde) | | | | | 4 | 3 |

Manufacture, vulcanisation and testing of the mixtures were carried out as described in Example 1.

PHYSICAL PROPERTIES OF THE MIXTURES

| M | t | T | E | M150 | M300 | PE | TR | H | R | P1 |
|---|---|---|---|---|---|---|---|---|---|---|
| VII | 20 | 243 | 223 | 82 | 224 | 7 | 16 | 75 | 25 | 78/70 |
|   | 40 | 231 | 258 | 112 |  | 6 | 15 | 79 | 24 |  |
|   | 60 | 195 | 213 | 122 |  | 4 | 13 | 79 | 24 |  |
| VIII | 20 | 240 | 351 | 72 | 204 | 8 | 16 | 74 | 26 | 83/76 |
|   | 40 | 210 | 272 | 89 |  | 6 | 15 | 75 | 26 |  |
|   | 60 | 184 | 256 | 85 |  | 5 | 16 | 76 | 26 |  |
| IX | 20 | 229 | 456 | 39 | 132 | 15 | 19 | 68 | 26 | 78/68 |
|   | 40 | 219 | 324 | 67 | 202 | 7 | 16 | 72 | 25 |  |
|   | 60 | 219 | 286 | 82 |  | 5 | 15 | 75 | 25 |  |
| X | 20 | 228 | 484 | 36 | 121 | 18 | 21 | 68 | 26 | 80/71 |
|   | 40 | 218 | 349 | 59 | 184 | 8 | 16 | 72 | 25 |  |
|   | 60 | 219 | 314 | 70 | 209 | 5 | 14 | 74 | 25 |  |
| XI | 20 | 229 | 442 | 41 | 137 | 15 | 22 | 70 | 24 | 80/71 |
|   | 40 | 215 | 315 | 68 | 206 | 6 | 16 | 74 | 23 |  |
|   | 60 | 213 | 270 | 87 |  | 4 | 16 | 75 | 23 |  |
| XII | 20 | 225 | 480 | 38 | 121 | 18 | 20 | 69 | 26 | 81/72 |
|   | 40 | 203 | 338 | 57 | 176 | 8 | 15 | 71 | 25 |  |
|   | 60 | 197 | 287 | 73 | 198 | 6 | 15 | 72 | 24 |  |

The excellent activation effect of pyromellitic dianhydride in mixtures VII and VIII is particularly remarkable. Fumaric acid, however, activated so strongly, that an excellent vulcanising effect was observed by using it with 3 parts of phenol resin. (See mixtures XI and XII.)

*Example 3*

In this example resins which are at least trifunctional were used. The commercial bisphenol resin used in mixtures XIII and XIV was a particularly suitable vulcanising agent. It was obtained by an extensive etherification of tetramethylol-p,p'-dihydroxydiphenylpropane with butanol so that the product was soluble in gasoline. It was used as a solution having a solids content of about 65–75%. The trifunctional phenol resin used in mixtures XV to XVII was produced as follows:

1 mol of phenol was reacted at 60–70° C. with 0.75 to 1 mol of caustic soda and then with 3.2 mols of formaldehyde, until almost all the formaldehyde had added with the mixture. Thereafter the mixture was neutralized with sulphuric acid of about 40 to 50% strength and the aqueous layer was separated. 0.125 mol of hydrogen chloride in the form of concentrated hydrochloric acid diluted with isobutanol were added thereto and the product was dehydrated by circulation distillation. The resin was then neutralized with caustic soda, filtered and concentrated. The viscosity of the resulting product was about 3400 centipoises and it was compatible with gasoline in a ratio between 1:3.8. The resin content was about 90%.

Manufacture, vulcanisation and testing of the mixtures were carried out as described in Example 1.

| Mixture | XIII | XIV | XV | XVI | XVII |
|---|---|---|---|---|---|
| Acrylonnitrile-butadiene-rubber (see Example 1) | 100 | 100 | 100 | 100 | 100 |
| Stearic acid | 1 | 1 | 1 | 1 | 1 |
| Zinc oxide | 5 | 5 | 5 | 5 | |
| Fumaric acid | 2 | | 2 | | |
| Pyromellitic dianhydride | | 3 | | 3 | 3 |
| High abrasion furnace carbon black | 45 | 45 | 45 | 45 | 45 |
| Bisphenol resin | 4 | 4 | | | |
| Trifunctional phenol resin | | | 6 | 6 | 6 |

TEST RESULTS OF THE MIXTURES

| M | t | T | E | M150 | M300 | PE | TR | H | R | P1 |
|---|---|---|---|---|---|---|---|---|---|---|
| XIII | 20 | 146 | 534 | 22 | 64 | 43 | 23 | 65 | 29 | 81/72 |
|   | 40 | 202 | 363 | 49 | 158 | 13 | 24 | 71 | 29 |  |
|   | 60 | 223 | 334 | 64 | 196 | 10 | 23 | 73 | 29 |  |
| XIV | 20 | 200 | 298 | 70 | 207 | 8 | 16 | 75 | 27 | 79/71 |
|   | 40 | 200 | 223 | 108 |  | 4 | 13 | 79 | 27 |  |
|   | 60 | 207 | 223 | 118 |  | 4 | 12 | 80 | 27 |  |
| XV | 20 | 99 | 638 | 22 | 45 | 65 | 21 | 64 | 26 | 74/64 |
|   | 40 | 188 | 445 | 41 | 115 | 28 | 15 | 70 | 26 |  |
|   | 60 | 215 | 384 | 55 | 159 | 16 | 16 | 71 | 26 |  |
| XVI | 20 | 192 | 324 | 66 | 176 | 10 | 15 | 74 | 22 | 75/65 |
|   | 40 | 193 | 244 | 101 |  | 6 | 14 | 78 | 22 |  |
|   | 60 | 200 | 219 | 121 |  | 4 | 13 | 78 | 22 |  |
| XVII | 20 | 195 | 331 | 59 | 173 | 11 | 16 | 73 | 23 | 74/65 |
|   | 40 | 208 | 254 | 96 |  | 6 | 14 | 75 | 22 |  |
|   | 60 | 181 | 203 | 118 |  | 4 | 11 | 78 | 22 |  |

The quickest and most intensive vulcanisation was attained with pyromellitic dianhydride. A comparison of mixtures XVI and XVII shows, that the addition of zinc oxide in mixture XVI effects an additional acceleration of the vulcanisation.

*Example 4*

Mixtures XVIII to XXIII were produced using a roll mill at 80–110° C., mixtures XX to XXIII being prepared from a commercial intimate mixture of 100 parts of butadiene-styrene-cold polymer with 23% styrene, 10 parts of a highly aromatic oil and 52 parts of high abrasion furnace carbon black. Mixture XXIV was produced according to the Technical Data Report No. 4 (August 1962) of Goodrich-Gulf Chemicals Inc. The oil, the terpene-phenol resin and the stearic acid were first worked into the polybutadiene on a roll mill. After this mixture had been stored overnight the zinc oxide and the carbon black were incorporated. Next day the activator and the phenol resin were added.

| Mixture | XVIII | XIX | XX | XXI | XXII | XXIII | XXIV |
|---|---|---|---|---|---|---|---|
| Butadiene-styrene-copolymer (commercial type with about 23% of styrene) | 100 | 100 | 91 | 91 | 91 | 91 | |
| Polybutadiene (commercial product with a content of 98% cis-units) | | | | | | | 100 |
| Stearic acid | | | 1 | 1 | 1 | 1 | 3 |
| Paraffin (melting point about 55° C.) | 1 | 1 | | | | | |
| Zinc oxide (commercial, containing lead oxide) | | 5 | 5 | 5 | | | 3 |
| High abrasion furnace carbon black | 50 | 50 | 47.3 | 47.3 | 47.3 | 47.3 | |
| Carbon black (ISAF-grade) | | | | | | | 50 |
| High aromatic oil | | | 9.1 | 9.1 | 9.1 | 9.1 | |
| Hydrocarbon oil (light, saturated to a large extent) | | | | | | | 8 |
| Terpenephenol resin (non-hardenable Alresen 214 R) | | | | | | | 3 |
| Zinc chloride-acetic acid [1] | 2 | 2 | 2 | | | | 2 |
| Zinc chloride-butanol [1] | | | | 2 | | | |
| Boron fluoride-diacetic acid | | | | | 1 | | |
| Molecular compound of boron-fluoride and 2 mols of n-butanol (boiling point 20 mm. Hg: 100–101° C.) | | | | | | 1 | |
| p-Tert.-butylphenol resin (condensed in an alkaline medium with more than 1.5 mols of formaldehyde added) | 6 | 6 | 6 | 6 | 6 | 6 | 6 |

[1] Produced by dissolving 1 mol of ZnCl₁ in 1 mol of acetic acid or butanol.

PHYSICAL PROPERTIES (VULCANISATION TEMPERATURE: 155° C.)

| M | t | T | E | M150 | M300 | PE | TR | H | R | P1 |
|---|---|---|---|---|---|---|---|---|---|---|
| XVIII | 20 | 209 | 410 | 49 | 145 | 9 | 14 | 66 | 37 | 70/60 |
| | 40 | 224 | 363 | 66 | 186 | 6 | 11 | 69 | 37 | |
| | 60 | 242 | 375 | 73 | 196 | 7 | 11 | 70 | 38 | |
| A70, 14 | 40 | 61 | 102 | | | .2 | 11 | 75 | 36 | |
| XIX | 20 | 238 | 438 | 50 | 155 | 9 | 15 | 68 | 35 | 80/70 |
| | 40 | 246 | 400 | 61 | 180 | 8 | 12 | 69 | 36 | |
| | 60 | 223 | 354 | 63 | 184 | 6 | 12 | 70 | 35 | |
| A70, 14 | 40 | 250 | 358 | 84 | 211 | 7 | 11 | 53 | 38 | |
| XX | 20 | 229 | 573 | 33 | 103 | 7 | 19 | 65 | 34 | 64/55 |
| | 40 | 227 | 496 | 41 | 124 | 12 | 17 | 68 | 33 | |
| | 60 | 210 | 437 | 44 | 134 | 10 | 16 | 69 | 34 | |
| XXI | 20 | 187 | 603 | 22 | 68 | 18 | 22 | 64 | 31 | 60/50 |
| | 40 | 226 | 584 | 30 | 97 | 14 | 17 | 65 | 30 | |
| | 60 | 230 | 548 | 33 | 105 | 12 | 17 | 66 | 30 | |
| XXII | 40 | | | 66 | | | | 70 | 36 | |
| XXIII | 40 | | | 69 | | | | 69 | 37 | |
| XXIV | 20 | 114 | 419 | 19 | 64 | 9 | 6 | 58 | 45 | 80/72 |
| | 40 | 120 | 355 | 26 | 91 | 6 | 16 | 62 | 46 | |
| | 60 | 164 | 416 | 28 | 99 | 6 | 11 | 64 | 44 | |

Mixture XVIII does not contain zinc oxide and even after aging for 14 days at 70° C., has unsatisfactory properties in contradistinction to mixture XIX (which contains zinc oxide). Mixtures XX and XXI show the effect of various ZnCl₂-complex compounds. Zinc chloride-butanol in mixture XXI is a weaker activator than the zinc chloride-acetic acid in mixture XX. Mixture XXI is vulcanized, however, considerably quicker than a similarly prepared mixture vulcanized with 2 parts of sulphur and 2 parts of di-2-benzothiazyldisulphide. The complex compound prepared from lauryl alcohol and zinc chloride had an equal activating effect to that prepared from zinc chloride and butanol. Mixtures vulcanized therewith are characterized by a materially improved plasticity. Phenol resins of p-octylphenol show practically the same vulcanisation effects as resins of p-tert.-butylphenol. Very good results may also be attained by vulcanisation of mixtures of polybutadiene and butadiene-styrene rubber using the complex compounds of zinc chloride and acetic acid as activator. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims; thus instead of uniform compounds in each instance a mixture of different compounds may be used.

What is claimed is:

1. Process which comprises vulcanizing a mixture comprising a filler and at least one elastomeric diene polymer selected from the group consisting of homopolymers of butadiene, chloroprene and isoprene, copolymers of butadiene with styrene, copolymers of butadiene with acrylonitrile and mixtures thereof by a vulcanizing agent comprising a condensation product of a phenol and an aldehyde selected from the group consisting of (A) products derived from phenols containing at the aromatic nuclei at least two positions reactive with aldehydes, said products containing at least one of the radicals selected from the group consisting of free alkylol groups, etherified alkylol groups and esterified alkylol groups in the molecule and (B) phenol aldehyde resins containing free alkylol groups and halomethyl groups, all of the said phenol aldehyde resins (A) and (B) containing groups selected from the class consisting of phenolic hydroxy and esterified phenolic hydroxy groups, and 0.2 to 5 percent by weight of the elastomer of an acid activator selected from the group consisting of (1) an organic polybasic acid, (2) an anhydride thereof, (3) a complex acid of zinc halide with any one of the acids selected from the group consisting of monobasic organic acids having up to 12 carbon atoms and organic polybasic acids, (4) a complex acid of boron trifluoride with any one of the organic acids defined sub (3), (5) a complex acid of zinc halide with an alcohol, (6) a complex acid of boron trifluoride with an alcohol, (7) a complex acid of boron trifluoride with water and (8) a mixture of at least two of such compounds, the alcohols recited sub (5) and (6) having up to 12 carbon atoms and up to 2 hydroxy groups, the said hydroxy groups being bound exclusively to aliphatic carbon atoms and the said alcohols being free from aliphatic unsaturation other than an olefinic bond.

2. Process which comprises vulcanizing a mixture comprising an elastomeric copolymer selected from the group consisting of butadiene-acrylonitrile-copolymers and butadiene-styrene-copolymers and a filler by 2 to 6 percent of a phenol formaldehyde resin containing free methylol groups, etherified methylol groups and free phenolic hydroxy groups, 1 to 4 percent of an anhydride of an organic polybasic acid and 3 to 10 percent of a reactive compound acting as a subsidiary activator selected from the group consisting of zinc oxide, lead oxide and reactive salts of zinc, tin and aluminum, the percentage figures being calculated on the weight of the polymer.

3. A process as claimed in claim 1 wherein the activator is present in an amount of 1 to 4 percent by the weight of the elastomer.

4. A process as claimed in claim 1 wherein the activator is an organic polybasic acid.

5. A process as claimed in claim 1 wherein there is also used, as a subsidiary accelerator, a compound selected from the group consisting of reactive oxides and salts of at least one metal of groups II and III of the periodic table and of heavy metals of a specific gravity greater than 4 and other than those belonging to groups II and III, in an amount of up 25 percent of the weight of the elastomer.

6. A process as claimed in claim 5 wherein the said subsidiary accelerator is present in an amount of 3 to 10 percent by the weight of the elastomer.

7. A process as claimed in claim 1 wherein there is also present an accelerator selected from the group consisting of (A) 0.1 to 8 percent of a halide of at least one metal of groups II and III of the periodic table and of heavy metals other than those belonging to groups II and III and having a specific gravity greater than 4 and (B) a halogen donor together with a compound of said metals reactive with said halogen donor at a temperature above 70° C. in an amount capable to yield 0.1 to 8 percent of metal halide, the percentage figures being referred to the weight of the elastomer.

8. A process as claimed in claim 1 wherein the phenol aldehyde resin is present in an amount of 0.5 to 8 percent by the weight of the elastomer.

9. Process which comprises vulcanising a mixture comprising a filler and an elastomeric copolymer of butadiene and acrylonitrile by 2 to 6 percent of a phenol formaldehyde resin containing free methylol groups, etherified methylol groups and free phenolic hydroxy groups, 1 to 4 percent of pyromellitic dianhydride and 3 to 10 percent of a reactive compound acting as a subsidiary activator selected from the group consisting of zinc oxide, lead oxide and reactive salts of zinc, tin and aluminum, the percentage figures being calculated on the weight of the polymer.

10. Process which comprises vulcanising a mixture comprising a filler and an elastomeric copolymer of butadiene with styrene by 2 to 6 percent of a phenol formaldehyde resin containing free methylol groups, etherified methylol groups and free phenolic hydroxy groups, 1 to 3 percent of a complex acid of zinc chloride and acetic acid and 3 to 10 percent of a reactive compound acting as a subsidiary activator selected from the group consisting of zinc oxide, lead oxide and reactive salts of zinc, tin and aluminum, the percentage figures being calculated on the weight of the polymer.

11. Process which comprises vulcanizing a mixture comprising a filler and an elastomeric butadiene polymer which is substantially free from polymerized isomonoolefines by 2 to 6 percent of a phenol formaldehyde resin containing free methylol groups, etherified methylol groups and free phenolic hydroxy groups, 0.5 to 2 percent of a complex of boron trifluoride with butanol and 3 to 10 percent of a reactive compound acting as a subsidiary activator selected from the group consisting of zinc oxide, lead oxide and reactive salts of zinc, tin and aluminum, the percentage figures being calculated on the weight of the polymer.

12. The vulcanisation product obtained by the process of claim 1.

13. Shaped bodies containing as an essential ingredient the vulcanisation product of claim 12.

14. Process as claimed in claim 1, wherein the phenol aldehyde condensation product is a condensation product of a para alkyl phenol in which the alkyl groups contain from 1 to 12 carbon atoms.

References Cited by the Examiner

UNITED STATES PATENTS

| | | | |
|---|---|---|---|
| 2,999,081 | 9/1961 | Stivers | 260—845 |
| 3,000,847 | 9/1961 | Graham | 260—845 |
| 3,036,986 | 5/1962 | O'Connor | 260—845 |
| 3,044,977 | 7/1962 | Coe | 260—845 |
| 3,056,754 | 10/1962 | Giller | 260—845 |

MURRAY TILLMAN, *Primary Examiner.*

E. J. TROJNAR, P. LIEBERMAN, *Assistant Examiners.*